US005653303A

United States Patent [19]

Kawamoto

[11] Patent Number: 5,653,303

[45] Date of Patent: Aug. 5, 1997

[54] EXHAUST SYSTEM OF MOTORCYCLE

[75] Inventor: Hitoshi Kawamoto, Hamamatsu, Japan

[73] Assignee: Suzuki Kabushiki Kaisha, Shizuoka-ken, Japan

[21] Appl. No.: 697,243

[22] Filed: Aug. 21, 1996

[30] Foreign Application Priority Data

Aug. 31, 1995 [JP] Japan .................................... 7-224348

[51] Int. Cl.[6] ...................................................... B60K 13/06

[52] U.S. Cl. ............................................ 180/219; 180/225

[58] Field of Search .................................... 180/219, 225, 180/226; 60/272

[56] References Cited

U.S. PATENT DOCUMENTS

| | | | |
|---|---|---|---|
| 3,453,824 | 7/1969 | Biesecker | 180/225 |
| 3,667,435 | 6/1972 | Bygdnes | 180/225 |
| 3,919,896 | 11/1975 | Foster | 180/225 |
| 4,799,569 | 1/1989 | Hattori et al. | 180/225 |

*Primary Examiner*—Richard M. Camby
*Attorney, Agent, or Firm*—Finnegan, Henderson, Farabow, Garrett & Dunner, L.L.P.

[57] ABSTRACT

An exhaust system of a motorcycle has exhaust pipe arrangement in which four exhaust pipes connected to front sides of cylinder heads of respective four cylinders of an engine with a pair of two cylinders being arranged in parallel with each other extend rearward of a motorcycle body by passing portions near an oil pan disposed below the engine, the respective two exhaust pipes are assembled in two sets of pipe assemblies by a pair of front side manifolds, respectively, and then, the two sets of pipe assemblies are assembled in one set of pipe assembly by another manifold disposed rearside of the paired manifolds, the one pipe assembly being connected to a silencer. The oil pan has a peripheral wall section constituting a side surface of the oil pan, the side surface has an inclination tapered downward the motorcycle body so as to provide substantially a V-shape in section substantially in parallel with bank angle lines of the motorcycle body, and the front side manifolds are disposed between a space defined by the inclined side surface of the oil pan and the bank angle lines of the motorcycle.

2 Claims, 6 Drawing Sheets

EXHAUST SYSTEM OF MOTORCYCLE

BACKGROUND OF THE INVENTION

The present invention relates to an exhaust system of a motorcycle.

In a known four-stroke-cycle multiple cylinder engine, a plurality of exhaust pipes are bundled in one unit or assembly by means of manifolds, which is then connected to a silencer. In a motorcycle, a manifold is generally disposed at a lower portion of a crank case of an engine for ensuring a large bank angle.

An engine mounted to a vehicle such as motorcycle is provided with a lot of sliding portions or rotating portions therein, and accordingly, it is necessary to be incorporated with a lubrication device for supplying a lubrication oil to reduce friction resistance of the respective portions to thereby fully achieve the suitable function of the engine.

For example, in the case of using a lubrication device of a four-stroke-cycle engine adopting a wet-sump system, the lubrication oil generally circulates such that the lubrication oil stored in an oil pan disposed at a lower portion of the crank case of the engine is pumped up by an oil pump, then filtered through an oil filter, circulates through an oil passage formed in the crank case and is then fed to various portions to be lubricated in the engine through external pipes or tubes. The oil circulating through the respective portions in the engine naturally drops down or returns again to the oil pan through the oil passage.

FIG. 6 shows a sectional view representing an arrangement of a manifold having a general structure, which is applicable to a parallel four cylinder engine, not shown. Four exhaust pipes, not shown, connected to the respective cylinders, are once assembled into two sets of pipe assemblies by means of front manifolds M and then further assembled into one set of pipe assembly by means of a rear manifold, not shown, such one set of pipe assembly being connected to a silencer, not shown. The front manifolds M are arranged approximately in parallel with each other below an oil pan P.

However, in the arrangement of such front manifolds M in a motorcycle, there is a case where sufficient minimum ground clearance and bank angle are not ensured. In order to solve this problem, it is attempted to locate the engine at a relatively high position or make shallow the depth of the oil pan. However, in the case where the engine is located at a high position, a steering stability of the motorcycle will be lowered and in the case where the depth of the oil pan is made shallow, the oil pan does not sufficiently achieve its function. That is, it becomes impossible to ensure a sufficient oil level height of the lubrication oil in the oil pan and the oil pump may absorb an air when the attitude of the motorcycle body changes, thus providing a problem.

In order to solve this problem, there is provided an arrangement such as shown in Japanese Patent Laid-open Publication No. HEI 5-84812 or No. HEI 6-19795, in which the exhaust pipe and the manifolds are arranged in one side of the oil pan to ensure the sufficient depth of the oil pan. However, according to such arrangement, a width dimension of the motorcycle is widened, thus reducing the bank angle, providing also a problem.

SUMMARY OF THE INVENTION

An object of the present invention is to substantially eliminate defects or problems encountered in the prior art described above and to provide an exhaust system of a motorcycle capable of sufficiently ensuring a depth of an oil pan with the minimum ground clearance and necessary bank angle being maintained.

Another object of the present invention is to provide an exhaust system of a motorcycle capable of preventing air absorption of an oil pump due to the change of an attitude of a motorcycle body.

These and other objects can be achieved according to the present invention by providing an exhaust system of a motorcycle in which four exhaust pipes connected to front sides of cylinder heads of respective four cylinders of an engine with a pair of two cylinders being arranged in parallel with each other extend rearward of a motorcycle body by passing portions near an oil pan disposed below the engine, the respective two exhaust pipes are assembled in two sets of pipe assemblies by a pair of front side manifolds, respectively, and then, the two sets of pipe assemblies are assembled in one set of pipe assembly by another manifold disposed rearside of the paired manifolds, said one pipe assembly being connected to a silencer, the exhaust system being characterized in that the oil pan has a peripheral wall section constituting a side surface of the oil pan, the side surface has an inclination tapered downward the motorcycle body so as to provide substantially a V-shape in section substantially in parallel with bank angle lines of the motorcycle body, and the front side manifolds are disposed between a space defined by the inclined side surface of the oil pan and the bank angle lines of the motorcycle.

An oil strainer constituting an engine lubrication device is disposed in the oil pan, and the oil strainer is covered by a funnel-shaped cover having an oil suction port opened at a bottom portion of the oil pan formed by the inclined side surface thereof.

According to the structures of the exhaust system of a motorcycle of the present invention described above, the oil pan is formed so as to provide the inclined side surface, i.e. peripheral wall section, to be substantially in V-shape in section in parallel with the bank angle lines of the motorcycle body, and the front side manifolds are arranged in the space between the inclined side surface of the oil pan and the bank angle lines. According to such arrangement, it is ensured that the oil pan has a sufficient deep depth without arranging the engine in a high position and with maintaining the suitable minimum ground clearance and the suitable bank angle. Furthermore, since the oil suction port of the funnel-shaped cover of the oil strainer is positioned at the deepest portion, i.e. bottom portion, of the oil pan, the air absorption of the oil pump due to the changing of the attitude of the motorcycle body can be prevented, thus fully achieving the function of the oil pan.

The nature and further functions of the present invention will be made more clear from the following descriptions made with reference to the accompanying drawings.

DESCRIPTION OF THE PREFERRED EMBODIMENT

One preferred embodiment of the present invention will be described hereunder with reference to the accompanying drawings.

Figure 1:
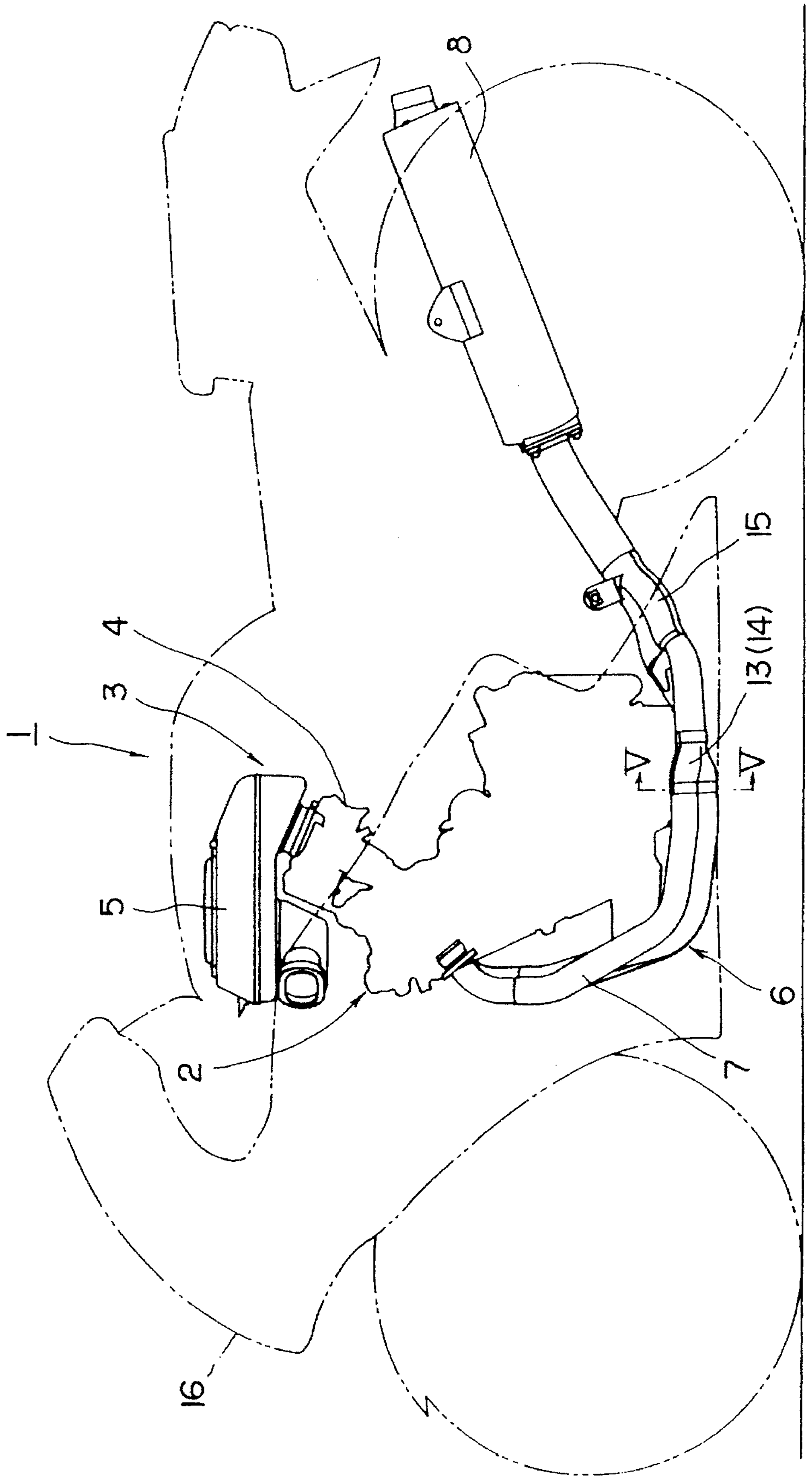
FIG. 1 is an illustrated side view of a motorcycle provided with one embodiment of an exhaust system of the present invention.

Referring to FIG. 1, a motorcycle 1 to which the present invention is applied is mounted with an engine 2 at a central lower portion of a motorcycle body. A carburetter 4 constituting an air taking device 3 of the engine 2 is connected to an upper portion of the engine 2, and an air cleaner 5 is connected to an upstream side of the carburetter 4. An exhaust pipe 7 constituting an engine exhaust device 6 is also connected to the front side of the engine 2 and a silencer 8 is connected to a downstream side of the exhaust pipe 7.

Figure 2:
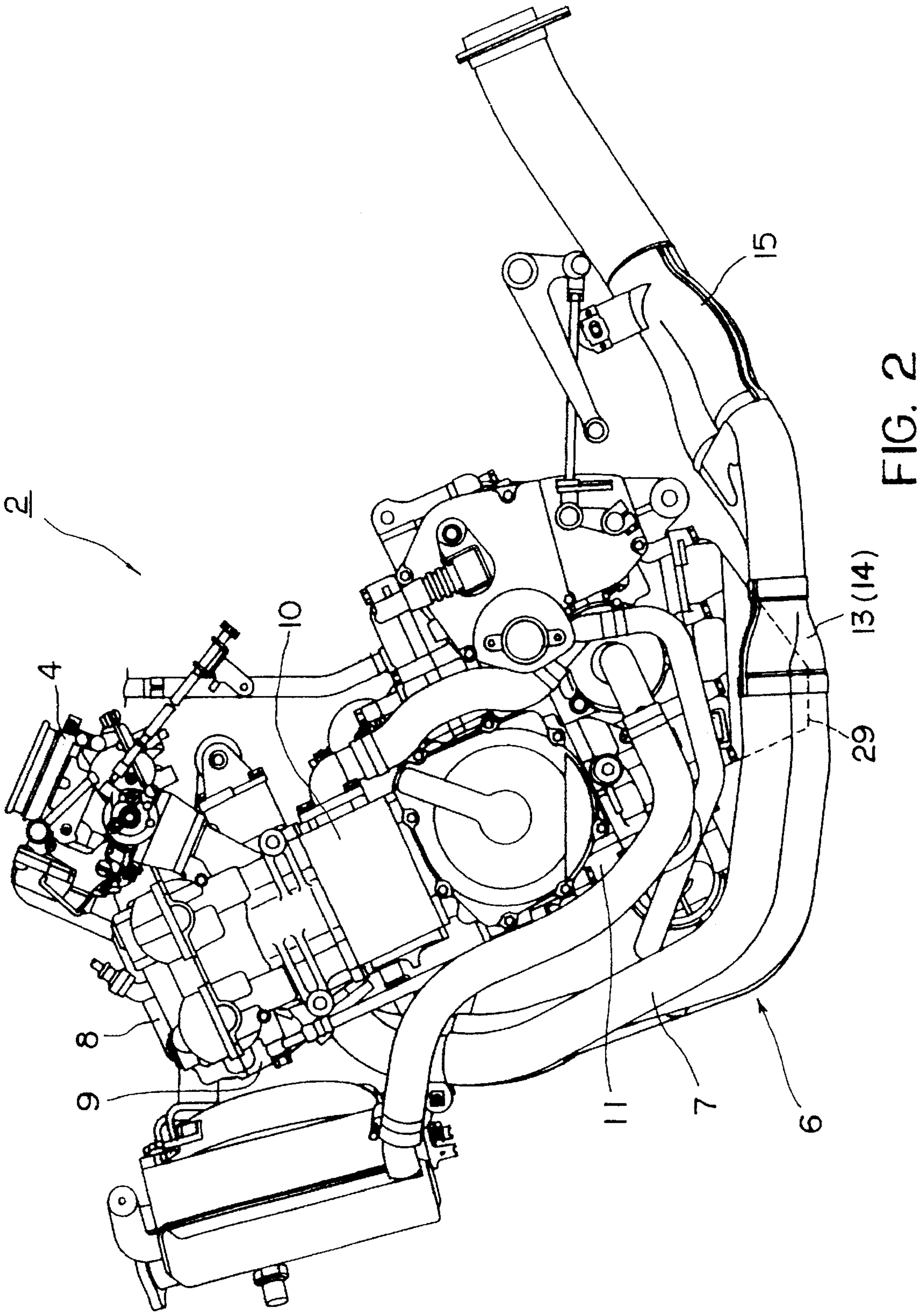
FIG. 2 is a left side view of an engine of the motorcycle of FIG. 1.
Figure 3:
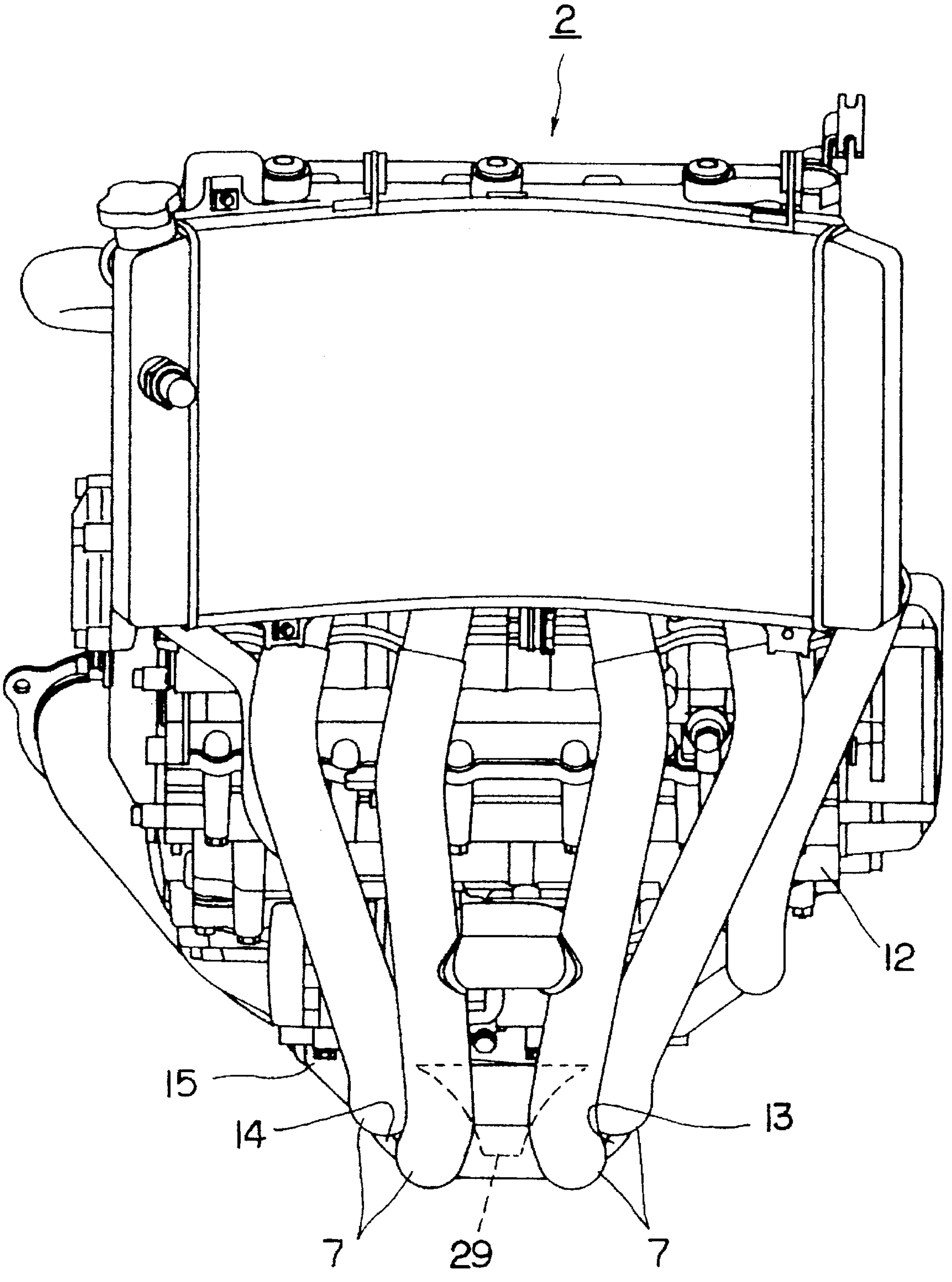
FIG. 3 is a front view of the engine of FIG. 2.
Figure 4:
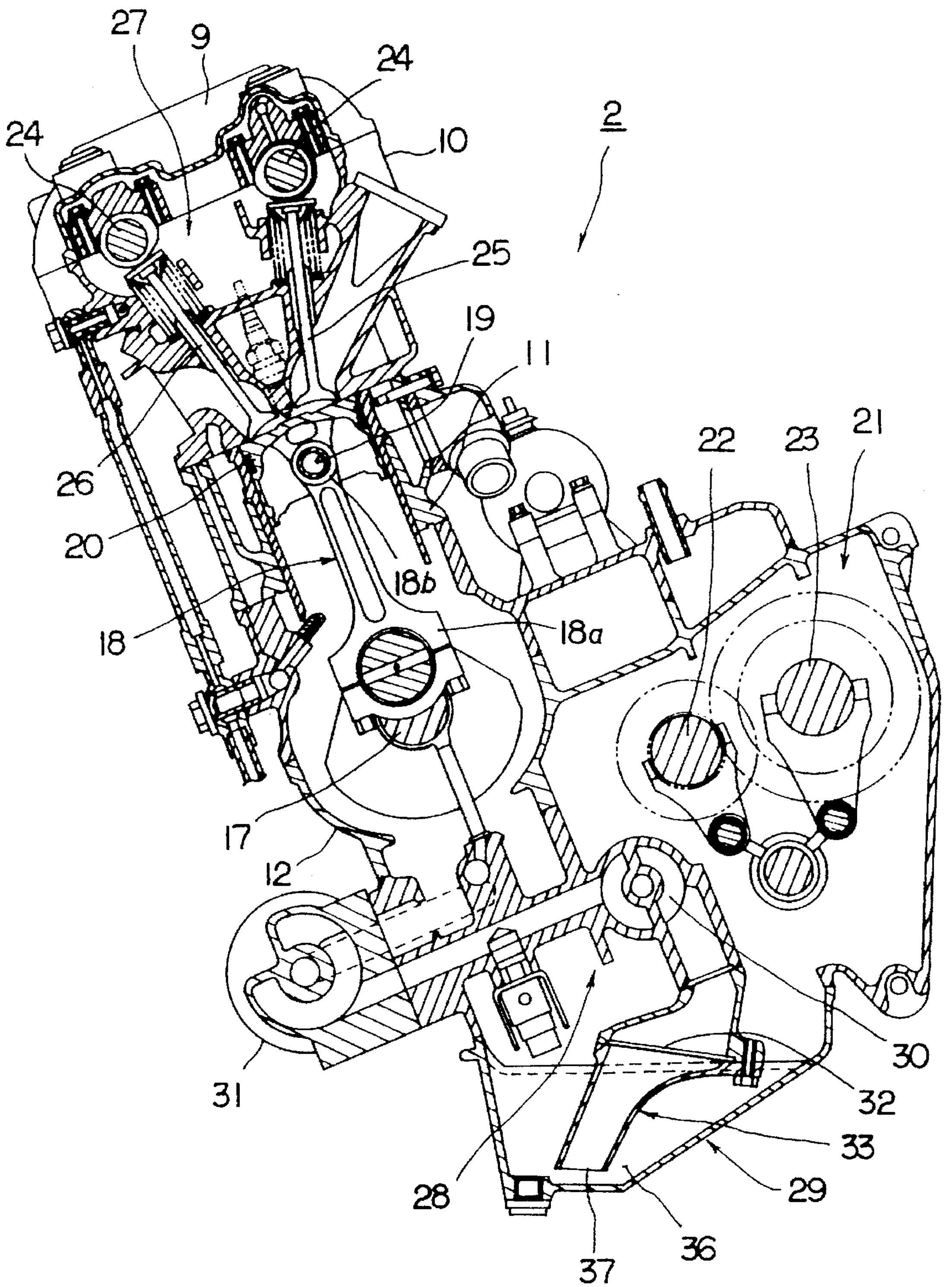
FIG. 4 is an elevational section of the engine.

Referring to FIGS. 2 to 4, the engine 2 mounted to the motorcycle 1 is of a parallel four cylinder engine composed of a cylinder head 10, a cylinder head cover 9, a cylinder block 11 and a crank case 12.

As shown in FIG. 1, four exhaust pipes 7 connected to front portions of the cylinder heads of the respective cylinders extend downward in a rearward direction from the front surface side of the engine and the respective two exhaust pipes are once assembled into two sets of pipe assemblies and then into one pipe set of pipe assembly, by means of a rear exhaust manifold 15, which is connected to the silencer 8.

A cowling 16 is disposed so as to cover the front portion of the motorcycle body and an entire structure of the engine 2.

A crank shaft 17 is disposed in the crank case 12 of the engine 2 and is connected to a large diameter end portion 18*a* of a connection rod 18, and a piston 20 is connected to a small diameter end portion 18*b* of the connection rod 18 through a piston pin 19. The piston 20 is accommodated to be slidable in the cylinder block 11 in a vertical arrangement as viewed.

The piston 20 is reciprocated in the cylinder and the reciprocating stroke of the piston 20 is converted into a rotational motion by means of the crank shaft 17, and the rotational motion is transmitted from a primary drive gear provided to one side portion of the crank shaft 17 to a counter shaft 21 and a drive shaft 23 of a transmission mechanism 21 through a clutch mechanism, not shown.

In the cylinder head 10, there is disposed a valve moving mechanism 27 composed of a cam shaft 24 and suction and exhaust valves 25 and 26.

The engine 2 is also provided with an engine lubrication device 28, which acts to feed, under pressure, a lubrication oil stored in an oil pan 29 disposed at the lower portion of the crank case 12 by means of an oil pump 30, through an oil filter 31, to the respective parts of the engine 2 such as the crank shaft 17, the valve moving mechanism 27 and the transmission mechanism 21.

An oil strainer 32 having metal mesh-like structure is disposed on the upstream side of the oil pump 30 to remove relatively large material mixed in the lubrication oil, and a funnel-shaped cover 33 is disposed below the oil strainer 32. The lubrication oil circulating in the engine 2 naturally drops in the crank case 12 or returns to the oil pan 29 through an oil return hole or oil return passage, not shown, and then re-circulates.

Figure 5:
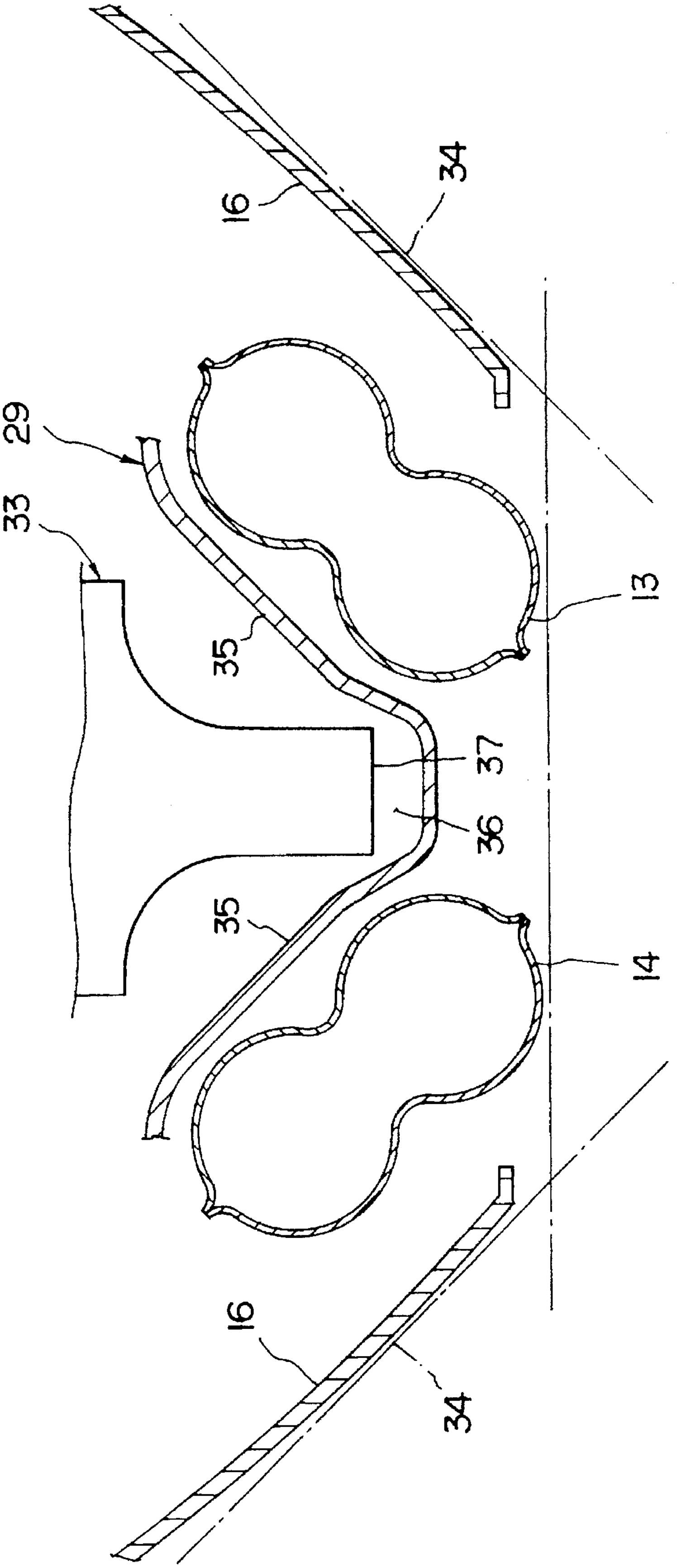
FIG. 5 is a sectional view taken along the line V—V in FIG. 1.
Figure 6:
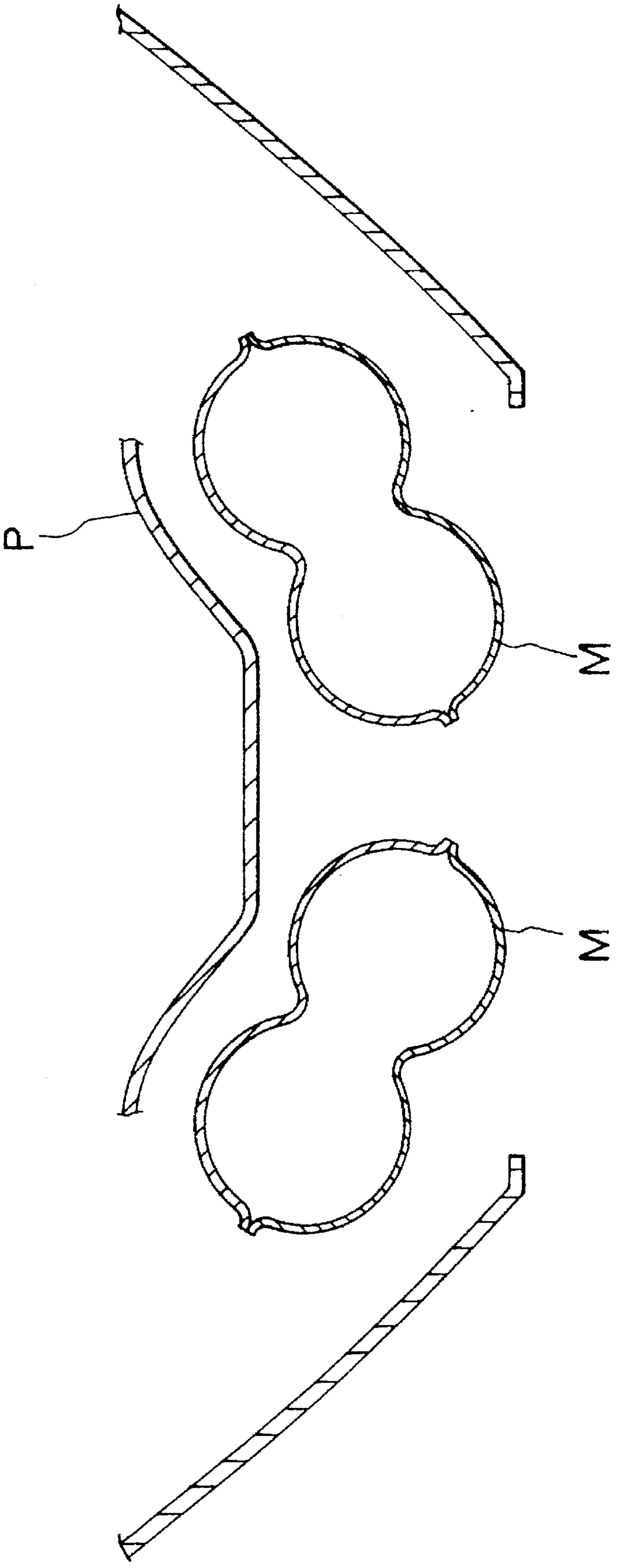
FIG. 6 PRIOR ART
FIG. 6 is a sectional view showing an arrangement of a manifold of conventional general structure.

Next, referring to FIGS. 3 and 5, the oil pan 29 has substantially a V-shape in section so as to have a bottom portion 36 disposed between the front side manifolds 13 and 14 to provide a deep depth. In FIG. 5, the oil pan 29 has a side surface 35 having an inclination substantially in parallel with the bank angle lines 34 of the motorcycle body. The exhaust manifolds 13 and 14 are arranged in a space between the inclined side surface 35 of the oil pan 29 and the bank angle lines 34. The bottom portion 36 of the oil pan is formed by the inclined side surface 35 and a funnel-shaped cover 33 attached to the oil strainer 32 is disposed in the oil pan 29 so that an oil suction port 37 thereof is positioned near the bottom portion 36.

As generally known, it is noted that the bank angle line is a line connecting a lower portion of a front wheel of a motorcycle and a front end portion of the motorcycle body extending laterally in the width direction of the motorcycle body at the lowest portion thereof, in this embodiment, a portion of the cowling 16.

The present invention having the structure described above will be operated in the following manner.

The oil pan 29 is formed so as to provide the inclined side surface 35, i.e. peripheral wall section, to be substantially in V-shape in section in parallel with the bank angle line 34, and the manifolds 13 and 14 are arranged in the space between the inclined side surface 35 and the bank angle line 34. According to such arrangement, it is ensured that the oil pan 29 has a sufficient deep depth without arranging the engine in a high position and with maintaining the suitable minimum ground clearance and the suitable bank angle. Furthermore, since the oil suction port 37 of the funnel-shaped cover 33 is positioned at the deepest portion, i.e. bottom portion 36, of the oil pan 29, the air absorption of the oil pump 30 due to the changing of the attitude of the motorcycle body can be prevented, thus fully achieving the function of the oil pan 29.

In the above descriptions, although the case in which four cylinders are arranged such that respective two cylinders are disposed in parallel with each other so as to provide a V-shape arrangement, is mentioned, the present invention will be applicable to an exhaust system of an engine having other multiple cylinder arrangement such as six cylinder arrangement providing parallel V-shape arrangement, for example.

What is claimed is:

1. In an exhaust system of a motorcycle in which four exhaust pipes connected to front sides of cylinder heads of respective four cylinders of an engine with a pair of two cylinders being arranged in parallel with each other extend rearward of a motorcycle body by passing portions near an oil pan disposed below the engine, the respective two exhaust pipes are assembled in two sets of pipe assemblies by a pair of front side manifolds, respectively, and then, the two sets of pipe assemblies are assembled in one set of pipe assembly by another manifold disposed rearside of the paired manifolds, said one set of pipe assembly being connected to a silencer, the improvement in which said oil pan has a peripheral wall section constituting a side surface of the oil pan, said side surface has an inclination tapered downward the motorcycle body so as to provide substantially a V-shape in section substantially in parallel with bank angle lines of the motorcycle body, and said front side manifolds are disposed between a space defined by said inclined side surface of the oil pan and the bank angle lines of the motorcycle.

2. An exhaust system of a motorcycle according to claim 1, wherein an oil strainer constituting an engine lubrication device is disposed in said oil pan, said oil strainer is covered by a funnel-shaped cover having an oil suction port opened at a bottom portion of the oil pan formed by the inclined side surface thereof.

* * * * *